(12) United States Patent
Hirano et al.

(10) Patent No.: US 12,482,804 B2
(45) Date of Patent: Nov. 25, 2025

(54) HEAT TREATMENT SYSTEM, SAGGAR AND METHOD OF HEAT-TREATING

(71) Applicant: NGK Insulators, Ltd., Nagoya (JP)

(72) Inventors: Masatoshi Hirano, Yokohama (JP); Takeshi Komaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 449 days.

(21) Appl. No.: 18/046,558

(22) Filed: Oct. 14, 2022

(65) Prior Publication Data

US 2023/0155106 A1 May 18, 2023

(30) Foreign Application Priority Data

Nov. 18, 2021 (JP) .................................. 2021-188132

(51) Int. Cl.
*F27D 3/00* (2006.01)
*F27D 5/00* (2006.01)
(Continued)

(52) U.S. Cl.
CPC ........ *H01M 4/0471* (2013.01); *F27D 3/0033* (2013.01); *F27D 5/0068* (2013.01);
(Continued)

(58) Field of Classification Search
CPC .... F27D 3/0021; F27D 3/0022; F27D 5/0012; F27D 5/0031; F27D 5/0068; F27M 2001/1504; C21D 9/0025
See application file for complete search history.

(56) References Cited

U.S. PATENT DOCUMENTS 1,677,452 A * 7/1928 Jeffery .................. C04B 41/009
428/164
10,054,365 B2 * 8/2018 Sonntag ................ F27D 3/0021
(Continued)

FOREIGN PATENT DOCUMENTS

CN 109956760 A * 7/2019 ......... C04B 41/5041
CN 111089474 A * 5/2020
(Continued)

OTHER PUBLICATIONS

German Office Action (Application No. 10 2022 127 284.2) dated Jun. 26, 2024 (with English translation) (10 pages).
Japanese Office Action (Application No. 2021-188132) dated Feb. 15, 2022 (with English translation).

*Primary Examiner* — Gregory A Wilson
(74) *Attorney, Agent, or Firm* — BURR PATENT LAW, PLLC

(57) ABSTRACT

A heat treatment system disclosed herein may include: one or more saggars, each of which is configured to accommodate powder of a lithium positive electrode material; and a heat treatment furnace configured to heat-treat the powder accommodated in the one or more saggars. Each of the one or more saggars may include a contact surface which is to make contact with the powder, wherein at least the contact surface of each saggar is constituted of a nickel-based alloy. The heat treatment furnace may be configured to heat-treat the powder accommodated in the one or more saggars at a temperature of 300° C. or more and 1000° C. or less for a duration of 10 hours or more and 30 hours or less.

8 Claims, 6 Drawing Sheets

(51) Int. Cl.
- *F27D 25/00* (2010.01)
- *H01M 4/04* (2006.01)
- *H01M 4/38* (2006.01)
- *H01M 4/02* (2006.01)

(52) U.S. Cl.
CPC ............ *F27D 25/00* (2013.01); *H01M 4/382* (2013.01); *H01M 2004/028* (2013.01)

(56) References Cited

U.S. PATENT DOCUMENTS

| | | | |
|---|---|---|---|
| 11,713,925 B2 * | 8/2023 | Park | C04B 35/481 266/171 |
| 2002/0102204 A1 * | 8/2002 | Kohiro | C01G 53/42 429/231.95 |
| 2015/0241127 A1 * | 8/2015 | Sonntag | F27D 5/0006 432/258 |

FOREIGN PATENT DOCUMENTS

| | | | | |
|---|---|---|---|---|
| CN | 113823764 A | * | 12/2021 | ........ H01M 10/0525 |
| DE | 11 2019 005 895 T5 | | 8/2021 | |
| JP | H05-033092 A | | 2/1993 | |
| JP | 2005-257171 A | | 9/2005 | |
| JP | 2015137814 A | * | 7/2015 | |
| JP | 2019-121601 A | | 7/2019 | |
| WO | WO-2022131871 A1 | * | 6/2022 | .............. F27B 17/00 |

\* cited by examiner

US 12,482,804 B2

HEAT TREATMENT SYSTEM, SAGGAR AND METHOD OF HEAT-TREATING

CROSS REFERENCE

The present application claims priority to Japanese Patent Application No. 2021-188132, filed on Nov. 18, 2021, the entire contents of which are incorporated herein by reference.

TECHNICAL FIELD

The art disclosed herein relates to an art configured to heat-treat powder of a lithium positive electrode material.

BACKGROUND ART

Powder which eventually becomes a lithium positive electrode material may be heat-treated in some cases by using a heat treatment furnace (e.g., roller hearth kiln). When the powder of the lithium positive electrode material (hereafter, may simply be referred to as "powder") is to be heat-treated in the heat treatment furnace, the powder is accommodated in a saggar, and the saggar with the powder accommodated therein is delivered into the heat treatment furnace. Since a temperature for heat-treating the powder of the lithium positive electrode material is high, the powder is accommodated in the saggar which is constituted of ceramic having a high heat-resistance. For example, Japanese Patent Application Publication No. 2019-121601 describes an example of a saggar constituted of ceramic.

SUMMARY

In Japanese Patent Application Publication No. 2019-121601, powder is accommodated in a saggar constituted of ceramic, and then the powder is heat-treated. However, since the ceramic constituting the saggar has a low heat conductivity, as compared to a saggar constituted of metal, for example, there have been some cases where using a saggar constituted of ceramic results in the powder being ineffectively heat treated.

The present teaching provide art configured to effectively heat-treat powder of a lithium positive electrode material.

A heat treatment system disclosed herein may comprise: one or more saggars, each of which is configured to accommodate powder of a lithium positive electrode material; and a heat treatment furnace configured to heat-treat the powder accommodated in the one or more saggars. Each of the one or more saggars may comprise a contact surface which is to make contact with the powder, wherein at least the contact surface of each saggar is constituted of a nickel-based alloy. The heat treatment furnace may be configured to heat-treat the powder accommodated in the one or more saggars at a temperature of 300° C. or more and 1000° C. or less for a duration of 10 hours or more and 30 hours or less.

A saggar disclosed herein may be for heat-treating powder of a lithium positive electrode material, the saggar being configured to accommodate the powder and to be disposed in a heat treatment furnace for heat treatment of the powder. The saggar may comprise a contact surface which is to make contact with the powder, wherein at least the contact surface of the saggar is constituted of a nickel-based alloy. The saggar may be configured such that a film thickness of an $Al_2O_3$ film formed on the contact surface when the nickel-based alloy is exposed to an oxygen-containing atmosphere at a temperature of 800° C. for 10 hours is within a range of 1 μm to 1 mm.

A method disclosed herein may be of heat-treating powder of a lithium positive electrode material. The method may comprise: supplying the powder into a saggar; and heat-treating the powder supplied in the saggar. The saggar may comprise a contact surface which is to make contact with the powder, wherein at least the contact surface of the saggar is constituted of a nickel-based alloy. The heat-treating may comprise heat-treating the powder supplied in the saggar at a temperature of 300° C. or more and 1000° C. or less for a duration of 10 hours or more and 30 hours or less.

DETAILED DESCRIPTION

Figure 1:
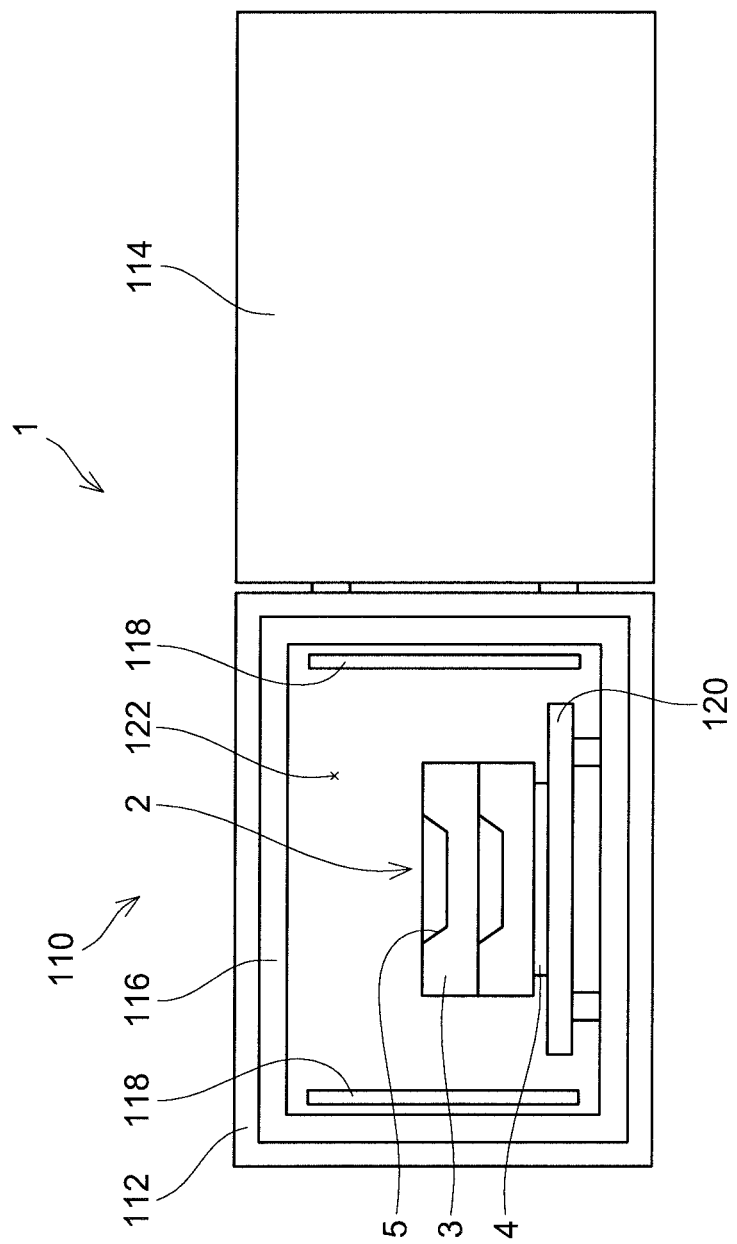
FIG. 1 illustrates a schematic structure of a heat treatment system according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved heat treatment systems, saggars and methods of heat-treating, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

A heat treatment system disclosed herein may comprise: one or more saggars, each of which is configured to accommodate powder of a lithium positive electrode material; and a heat treatment furnace configured to heat-treat the powder accommodated in the one or more saggars. Each of the one or more saggars may comprise a contact surface which is to make contact with the powder, wherein at least the contact surface of each saggar is constituted of a nickel-based alloy. The heat treatment furnace may be configured to heat-treat the powder accommodated in the one or more saggars at a temperature of 300° C. or more and 1000° C. or less for a duration of 10 hours or more and 30 hours or less.

In the above heat treatment system, in each of the one or more saggars, the contact surface which is to make contact with the powder is constituted of the nickel-based alloy. The nickel-based alloy has a higher heat conductivity than ceramic. By accommodating the powder in the saggar(s) of which at least contact surface is constituted of the nickel-based alloy and conducting heat treatment on the saggar(s) accommodating the powder, the powder in the saggar(s) can be effectively heated in the heat treatment. Further, the heat treatment furnace is configured to heat-treat the powder at the temperature of 300° C. or more and 1000° C. or less (i.e., 300° C. to 1000° C.) for the duration of 10 hours or more and 30 hours or less (i.e., 10 to 30 hours). By heat-treating the powder with the use of the above saggar(s) and under the above conditions, the powder, which is the lithium positive electrode material, can be suitably heat-treated.

In the heat treatment system disclosed herein, the nickel-based alloy may contain aluminum. An aluminum content of the nickel-based alloy may be 1 wt % or more and 10 wt % or less. According to such configuration, the $Al_2O_3$ film of a suitable thickness can be formed on the contact surface of each of the one or more saggars in the heat treatment.

In the heat treatment system disclosed herein, the heat treatment furnace may be configured to heat-treat the powder accommodated in the one or more saggars in an oxygen-containing atmosphere. According to such configuration, the $Al_2O_3$ film can be suitably formed on the contact surface of each of the one or more saggars in the heat treatment.

The heat treatment system disclosed herein may further comprise: a supply device configured to supply the powder into each of the one or more saggars; a recovery device configured to recover the powder heat-treated by the heat treatment furnace from each of the one or more saggars; and a cleaning device configured to clean the contact surface of each saggar after the powder has been recovered by the recovery device. The cleaning device may be configured to remove the powder having remained on the contact surface of each saggar and a reaction product generated by heat-treating the powder from the contact surface of each saggar after the powder has been recovered by the recovery device. The one or more saggars may be used such that the one or more saggars circulate between the supply device, the heat treatment furnace, the recovery device, and the cleaning device. According to such configuration, the heat treatment system allows the saggar(s) to be repeatedly used for heat-treating the powder. Due to this, a burden on an operator for re-using the saggar(s) can be reduced.

In the heat treatment system disclosed herein, the heat treatment furnace may comprise a heat treatment unit configured to heat-treat the powder accommodated in the one or more saggars and a cooling unit configured to cool the powder that has been heat-treated by the heat treatment unit. According to such configuration, the saggar(s) are cooled by the cooling unit after the saggar(s) have been heat-treated by the heat treatment unit. The saggar(s) are constituted of the nickel-based alloy with high heat conductivity, by which the powder can be heat-treated in the heat treatment unit effectively, and also the powder can be cooled in the cooling unit effectively.

In the heat treatment system disclosed herein, the one or more saggars may comprise a plurality of saggars. The plurality of saggars may be configured to be arranged in the heat treatment furnace in a state of being stacked in an up-down direction. According to such configuration, since the plurality of saggars can be heat-treated in the state of being stacked in the up-down direction, a large volume of the powder can be heat-treated at the same time. Further, due to the saggars being constituted of the nickel-based alloy, the heat easily translates between the saggars adjacent to each other in the up-down direction in the state of being stacked in the up-down direction. Due to this, even when the plurality of saggars is stacked in the up-down direction, the heat transfer to the powder in each saggar is not hindered by other saggar(s), as a result of which the powder accommodated in each of the saggars can suitably be heat-treated.

In the heat treatment system disclosed herein, the one or more saggars may be each configured such that a film thickness of an $Al_2O_3$ film formed on the contact surface when the one or more saggars are exposed to an oxygen-containing atmosphere at the temperature of 800° C. for 10 hours is within a range of 1 μm to 1 mm.

A saggar disclosed herein may be for heat-treating powder of a lithium positive electrode material, the saggar being configured to accommodate the powder and to be disposed in a heat treatment furnace for heat treatment of the powder. The saggar may comprise a contact surface which is to make contact with the powder, wherein at least the contact surface of the saggar is constituted of a nickel-based alloy. The saggar may be configured such that a film thickness of an $Al_2O_3$ film formed on the contact surface when the nickel-based alloy is exposed to an oxygen-containing atmosphere at a temperature of 800° C. for 10 hours is within a range of 1 μm to 1 mm.

In the above saggar, the contact surface of the saggar which is to make contact with the powder is constituted of the nickel-based alloy which contains aluminum. Further, the film thickness of the $Al_2O_3$ film formed on the nickel-based alloy contact surface when the nickel-based alloy is exposed to the oxygen-containing atmosphere at the temperature of 800° C. for 10 hours is within the range of 1 μm to 1 mm. Due to this, when the powder is heat-treated by using the above saggar under the above conditions, the $Al_2O_3$ film of which film thickness is within the range of 1 μm to 1 mm is formed on the contact surface of the saggar. By the $Al_2O_3$ film being formed on the contact surface of the saggar, deterioration of the saggar (nickel-based alloy) due to the powder (lithium positive electrode material) can suitably be suppressed while contamination of the powder is also suppressed.

A method disclosed herein may be of heat-treating powder of a lithium positive electrode material. The method may comprise: supplying the powder into a saggar; and heat-treating the powder supplied in the saggar. The saggar may comprise a contact surface which is to make contact with the powder, wherein at least the contact surface is constituted of a nickel-based alloy. The heat-treating may comprise heat-treating the powder supplied in the saggar at a temperature of 300° C. or more and 1000° C. or less for a duration of 10 hours or more and 30 hours or less.

In the above heat treatment method, the powder is accommodated in the saggar comprising the contact surface which is to make contact with the powder and is constituted of the nickel-based alloy, and the powder accommodated in that saggar is heat-treated at the temperature of 300° C. or more and 1000° C. or less (i.e., 300° C. to 1000° C.) for the duration of 10 hours or more and 30 hours or less (i.e., 10 to 30 hours). Due to this, the same effect can be achieved as the above heat treatment system does.

EMBODIMENTS

First Embodiment

With reference to drawings, a heat treatment system 1 according to the present embodiment will be described. As shown in FIG. 1, the heat treatment system 1 comprises saggars 2, and a heat treatment furnace 110.

Each of the saggars 2 is configured to accommodate a treatment object in a form of powder. In the present embodiment, the treatment object accommodated in each saggar 2 is powder of a lithium positive electrode material (hereafter, may simply be referred to as "powder").

Each saggar 2 has a shape which allows multiple saggars to be stacked on one another in an up-down direction. As shown in FIG. 1, each saggar 2 comprises a body 3 and a support portion 4. The body 3 has a box shape being substantially rectangle in plan view and it accommodates the powder therein. Each side of the body 3 has a plate thickness of substantially 2 to 3 mm. The support portion 4 protrudes downward from a lower surface of the body 3. The support portion 4 is configured such that an entirety of its outer periphery is smaller than an outer periphery of the body 3. Specifically, the support portion 4 is configured such that the entirety of the outer periphery of the support portion 4 is slightly smaller than an inner periphery of the body 3. Due to this, the multiple saggars 2 can be stacked on one another in the up-down direction, and when one saggar 2 is stacked on another saggar 2, a position of the one saggar 2 is suppressed from being displaced from the other saggar 2.

Further, each side surface of the body 3 comprises a recess 5. Specifically, the recess 5 is defined by a central area of an upper end of the side surface of the body 3 being cut out downward as the saggar 2 is seen from a lateral side. When the multiple saggars 2 are heat-treated in the stacked state in the up-down direction, the recesses 5 enable gas generated and emitted from the powder accommodated in the saggars 2 during the heat treatment to be ventilated out of each saggar 2 through the recesses 5.

Further, each saggar 2 is constituted of a nickel-based alloy. The nickel-based alloy of the present embodiment contains 90 wt % or more of nickel and 1 wt % or more and 10 wt % or less (1 to 10 wt %) of aluminum. There may be a case where, during the heat treatment, the powder and component(s) of the saggar 2 may react on a surface of the saggar 2, resulting in the component(s) of the saggar 2 being mixed with the powder. When the saggar 2 contains a great amount of component(s) other than metal included in the lithium positive electrode material (e.g., nickel, cobalt, manganese), those component(s) may be mixed into the powder during the heat treatment, which eventually causes a contamination. The nickel-based alloy contains 90 wt % or more of nickel, and thus a content of metal that is not the metal included in the lithium positive electrode material is small.

As a result, the powder can be suppressed from being contaminated during the heat treatment.

Further, if component(s) of the powder (e.g., lithium) react with the saggar 2, the component(s) of the powder may enter the saggar 2 (that is, the saggar 2 may be oxidized by the component(s) contained in the powder). The nickel-based alloy of which the saggar 2 is constituted contains aluminum. Due to this, an $Al_2O_3$ film is formed on the surface of the saggar 2 by the saggar 2 being heated in an oxygen-containing atmosphere during the heat treatment. The formation of the $Al_2O_3$ film on the surface of the saggar 2 can enhance strength of the saggar 2, and also entry of the component(s) of the powder into the saggar 2 (oxidization (contamination) of the saggar 2) can be suppressed. The $Al_2O_3$ film with a sufficient thickness can be formed by the heat treatment on the surface of the saggar 2 with an aluminum content of 1 wt % or more. Further, when the aluminum content is 10 wt % or less, a nickel content in the nickel-based alloy can be prevented from becoming excessively low. Further, the film thickness of the $Al_2O_3$ film formed on the surface of the saggar 2 can be prevented from being excessively thick. The nickel-based alloy of the present embodiment contains 0.05 to 6.0 wt % of Al, 0.1 to 3.0 wt % of Si, 0.8 to 6.0 wt % of Cr, 0.05 to 1.5 wt % of Mn, and contains Ni and inevitable impurities as its remaining part.

The heat treatment furnace 110 is configured to heat-treat the powder in the saggars 2. In the present embodiment, the heat treatment furnace 110 is a batch-type heat treatment furnace. As shown in FIG. 1, the heat treatment furnace 110 comprises a furnace body 112 and a board 120.

The furnace body 112 has a substantially cuboid shape, and comprises a ceiling wall, a bottom wall, three side walls (in FIG. 1, the side wall on the farthest side is omitted), and a door 114. FIG. 1 illustrates the door 114 being in an opened state. In the state of the door 114 being opened, the saggar(s) 2 can be put in the furnace body 112 and can be removed from the furnace body 112. In a state of the door 114 being closed, a space 122 within the furnace body 112 is enclosed by the ceiling wall, the bottom wall, the three side walls, and the door 114.

A heat insulation material 116 and heaters 118 are disposed in the furnace body 112. The heat insulation material 116 is disposed along internal walls of the furnace body 112. The heat insulation material 116 covers inner surfaces of the furnace body 112. Specifically, the heat insulation material 116 is disposed on an inner surface of the ceiling wall, an inner surface of the bottom wall, respective inner surfaces of the three side walls, and an inner surface of the door 114 (surface which is exposed to the space 122 within the furnace body 112 when the door 114 is closed). The heaters 118 are respectively arranged on the inner surfaces of the two side walls which are orthogonal to the door 114 (that is, two side walls depicted in FIG. 1). Here, positions of the heaters may not be limited to the above-mentioned layout. The heaters may be selectively positioned at desired positions, for example, in accordance with position(s) of the saggar(s) 2 to be housed in the furnace body 112, and/or with number of the saggar(s) 2 to be housed in the furnace body 112.

The board 120 is configured to carry the saggar(s) 2 thereon, and in the present embodiment, its upper surface has a plate shape. The saggars 2 are to be arranged in the stacked state in the up-down direction on the upper surface of the board 120. The board 120 is configured to be housed in the furnace body 112 (specifically, on the bottom wall thereof) and also configured to be removed from the furnace body 112. The saggars 2 are placed on the board 120 outside the furnace body 112, and the board 120 is put into the furnace body 112 with the saggars 2 placed on the upper surface of the board 120. The powder accommodated in the saggars 2 is heat-treated in a state where the saggars 2 are accommodated in the furnace body 112 and the door 114 is closed.

In the present embodiment, the board 120 has a shape which allows one saggar 2 to be placed thereon in a top view, however, the disclosure herein is not limited to this configuration. The board may have a shape which allows multiple saggars 2 to be placed thereon in the top view. Further in the present embodiment, the heat treatment furnace 110 has the furnace body 112 of the substantially cuboid shape, however, the disclosure herein is not limited to this configuration. The heat treatment furnace simply needs to be configured to heat-treat the powder within one or more saggars 2 in the state of housing the saggar(s) 2 therein, and thus the furnace body may be cylindrical for example.

Oxygen-containing gas is supplied to the heat treatment furnace 110 by an atmospheric gas supply unit (not shown). As mentioned above, the nickel-based alloy of which each saggar 2 is constituted contains aluminum. Due to this, by heat-treating the powder accommodated in the saggars 2 in the atmosphere including oxygen, $Al_2O_3$ film is formed on the surface of the saggars 2.

Further, in the present embodiment, the space 122 within the heat treatment furnace 110 is adjusted such that its temperature (atmospheric temperature) is 300° C. or more and 1000° C. or less (i.e., 300° C. to 1000° C.). By adjusting the temperature to be 300° C. or more, the powder accommodated in the saggars 2 can be suitably heat-treated. Further, by adjusting the temperature to be 1000° C. or less, heat resistance (that is, resistance to high-temperature oxidization) of the saggars 2 constituted of the nickel-based alloy can be maintained as long as the heat treatment duration is within a range as described later.

Further in the heat treatment furnace 110, the powder accommodated in each saggar 2 is heat-treated for a duration of 10 hours or more and 30 hours or less. By setting the duration which each saggar 2 is heat-treated in the heat treatment furnace 110 to 10 hours or more, a state in which the $Al_2O_3$ film is suitably formed on the surface of each saggar 2 can be maintained. Further, by setting the duration which each saggar 2 is heat-treated in the heat treatment furnace 110 to 30 hours or less, the heat resistance of each saggar 2 constituted of the nickel-based alloy can be maintained.

Typically, when the powder of the lithium positive electrode material is heat-treated at a high temperature, a saggar made of a ceramic having a high heat resistance is often used. The ceramic, however, has a low heat conductivity, and as such, if the powder is accommodated in the ceramic saggar and then the powder is heat-treated, there may be a case where the powder in the saggar is not effectively heat-treated. Further, the ceramic is low in durability as compared to a metal, and the number of times the ceramic can be repeatedly used is limited. In the present embodiment, the saggars 2 constituted of the nickel-based alloy are used for heat-treating the powder. Since the nickel-based alloy has a higher heat conductivity, the powder in the saggars 2 can be effectively heat-treated by using the saggars 2 constituted of the nickel-based alloy. Further, since the saggars 2 in the present embodiment are constituted of a material having high heat conductivity, a time required for the powder in each saggar 2 to reach a target temperature in the heat treatment furnace 110 can be shortened. Due to this, a whole duration of the heat treatment can be shortened. In addition, the saggars 2 are constituted of the material having the high heat conductivity, due to which the powder can be sufficiently heat-treated even when a low temperature is used in the heat treatment, as compared to a case where the ceramic saggars are used. Thus, because the heat treatment duration can be shortened and also the temperature during the heat treatment can be set low, even the saggars 2 constituted of the nickel-based alloy can be used for heat treating the powder appropriately. Further, since the heat treatment duration can be shortened and also the temperature can be set low, heat energy can be reduced. Further, since the heat conductivity of the saggars 2 is high, a duration of cooling the saggars 2 and the powder accommodated in those saggars 2 after the heat treatment can also be shortened. Further, the time taken for an entire cycle of heat treatment (that is, heat treatment and cooling treatment) can be shortened, and thus productivity can be improved. Further, although the ceramic saggar typically has a thickness of 10 to 15 mm, each saggar 2 in the present embodiment is constituted of the metal, and may comprise a thickness of 2 to 4 mm. Due to this, the saggars 2 in the present embodiment enable the heat conductivity to be improved better than the ceramic saggars, and due to the thin thickness, a quantity of powder that can be accommodated therein can be increased as compared to the ceramic saggar. In regards to this as well, the productivity can be improved by using the saggars 2 according to the present embodiment.

Further, the saggars 2 are constituted of the nickel-based alloy containing aluminum, and thus are resistant to corrosion, and have a high resistance to repetitious uses. Due to this, the saggars 2 may be used repetitiously for a greater number of times as compared to the ceramic saggars.

Further, since the saggars 2 are constituted of the material having the high heat conductivity, heat in each saggar 2 easily transfers to other saggar(s) 2 adjacent thereto in the heat treatment furnace 110. Due to this, the heat is easily exchanged between the saggars 2 stacked in the up-down direction (as well as between the adjacent saggars when the saggars are arranged side by side on flat surface), as a result of which uneven distribution of the heat between the saggars 2 can be suppressed.

In the present embodiment, the heat treatment furnace 110 has been adjusted such that it takes substantially 10 hours for each saggar 2 to be heat-treated. Further, it has been adjusted such that the heat treatment furnace 110 is in the oxygen-containing atmosphere, and the temperature within the heat treatment furnace 110 is substantially 800° C. The saggars 2 are configured such that when the powder accommodated in the saggars 2 is heat treated under these conditions, the $Al_2O_3$ film with a film thickness of 1 μm to 1 mm is formed on the surface of each saggar 2. The film thickness of the $Al_2O_3$ film is designed to be 1 μm or more for sufficiently suppressing oxidization of each saggar due to the powder (Li). The film thickness of the $Al_2O_3$ film is designed to be 1 mm or less for sufficiently suppressing contamination of the powder caused by the $Al_2O_3$ films being peeled off from the saggars. Due to this, the corrosion of the saggars 2 can be suppressed in the heat treatment and the contamination can be suppressed in the heat treatment, and thus the powder accommodated in the saggars 2 can be suitably heat-treated by the heat treatment furnace 110.

Second Embodiment

Although in the above embodiment, the heat treatment system 1 comprises the heat treatment furnace 110 of the batch-type, the disclosure herein is not limited to such configuration. For example, as shown in FIGS. 2 and 3, a heat treatment system 100 may comprise a heat treatment furnace 10 configured to heat-treat powder accommodated in saggars 2 while conveying the saggars 2 with conveyor devices (52, 54).

Figure 2:
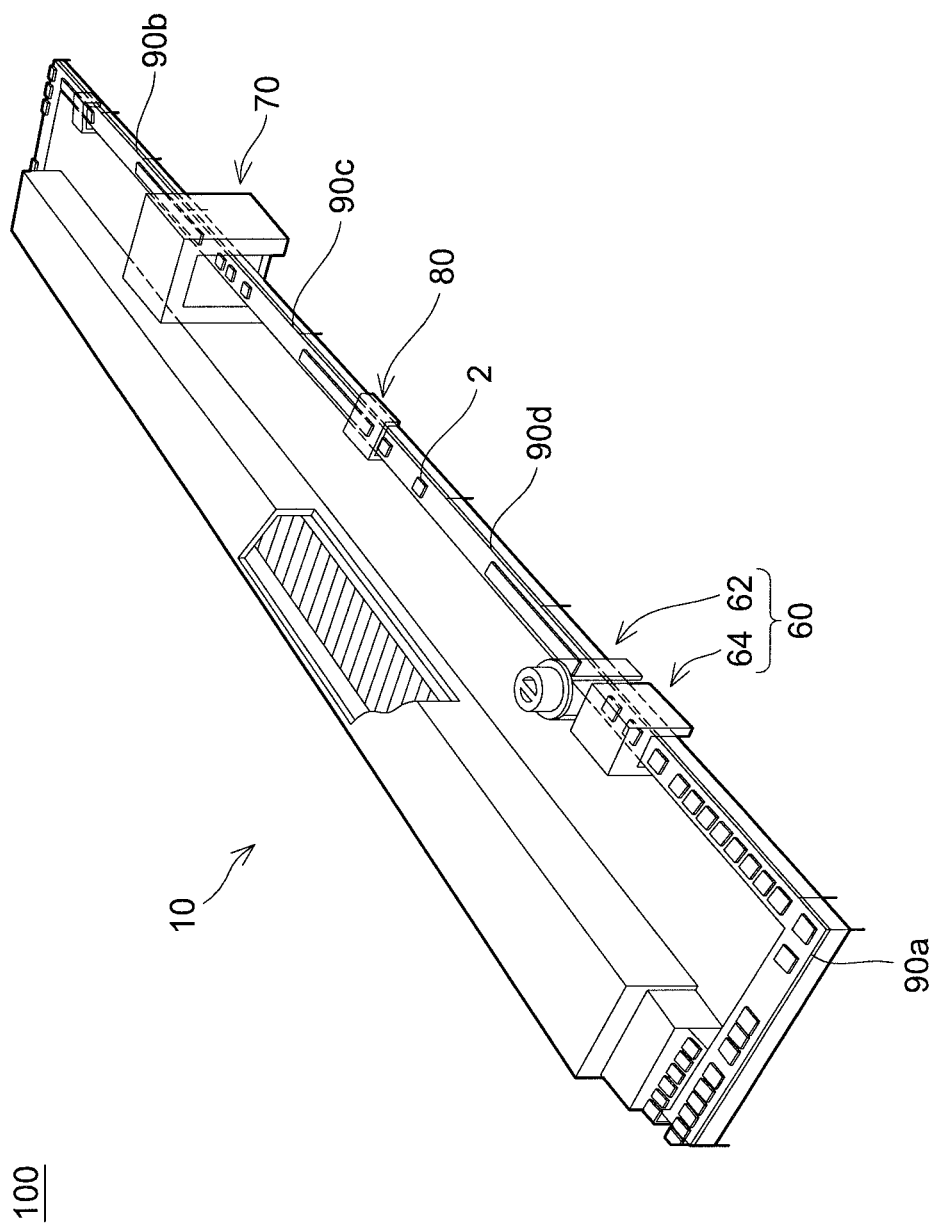
FIG. 2 illustrates a schematic structure of a heat treatment system according to a second embodiment.
Figure 3:
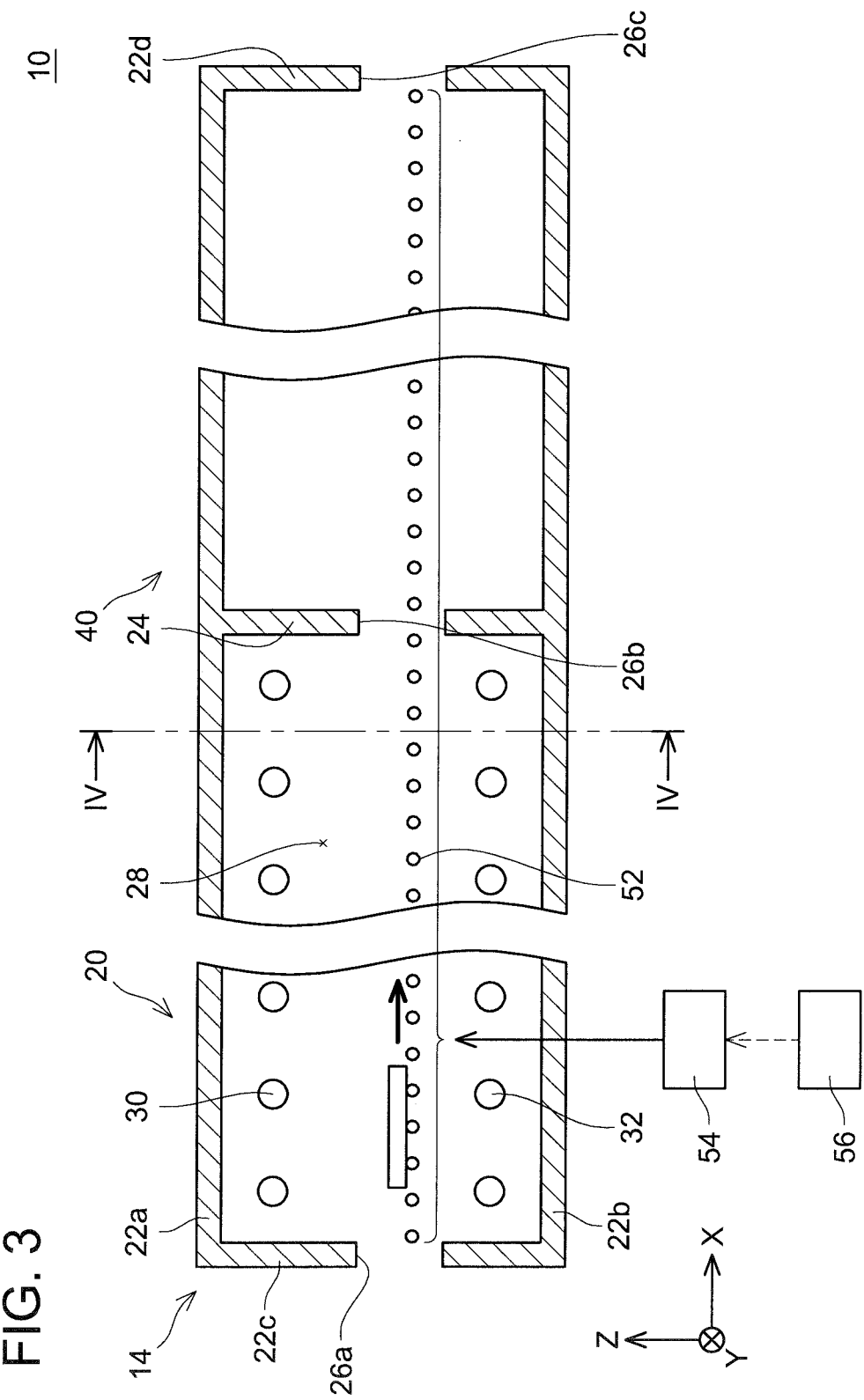
FIG. 3 illustrates a schematic structure of the heat treatment system in a vertical cross-sectional view of a heat treatment furnace along a plane parallel to a conveying direction of saggars.
Figure 5:
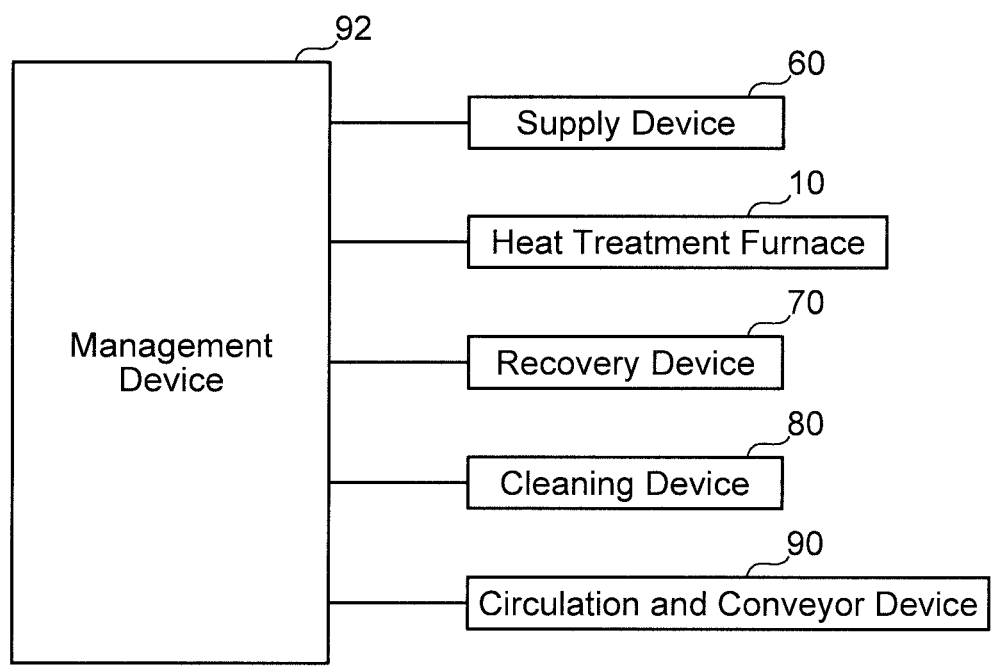
FIG. 5 illustrates a block diagram indicating a control system of a heat treatment system according to an embodiment.

As shown in FIGS. 2 and 5, the heat treatment system 100 comprises the saggars 2, a supply device 60, the heat treatment furnace 10, a recovery device 70, a cleaning device 80, a circulation and conveyor device 90, and a management device 92. Here, a configuration of each saggar 2 is the same as that of the saggars 2 in the first embodiment, thus detailed description of which will be omitted. The heat treatment system 100 in the present embodiment is configured such that the saggars 2 circulate between the supply device 60, the heat treatment furnace 10, the recovery device 70, and the cleaning device 80. The powder is heat-treated as the saggars 2 travel through the heat treatment furnace 10.

The supply device 60 is configured to supply the powder into each saggar 2. The supply device 60 only needs to be configured to supply the powder into each saggar 2, and a specific configuration thereof may not be limited. As shown in FIG. 2, the supply device 60 comprises a supply portion 62 and a leveler portion 64. The supply portion 62 is configured to supply the powder into each saggar 2. Specifically, the supply portion 62 comprises a supply port (not shown) through which the powder is poured from above the saggar 2 into the saggar 2. The supply port is arranged so as to be positioned above a center of a saggar 2 when the saggar 2 is disposed in the supply portion 62. Alternatively, the supply portion 62 may comprise a plurality of supply ports arranged therein. Since the supply portion 62 supplies the powder by pouring the powder from above into each saggar 2, the powder is filled in each saggar 2 in a state of its upper surface having a peak below the supply port after the powder is supplied in the saggar 2 at the supply portion 62. The leveler portion 64 levels the powder which was supplied in the saggar 2 by the supply portion 62. Specifically, the leveler portion 64 is configured to level the powder by pressing the powder in the saggar 2 with a surface of a flat plate of the leveler portion 64. The powder accommodated in the saggar 2 becomes substantially level by being leveled by the leveler portion 64.

Figure 4:
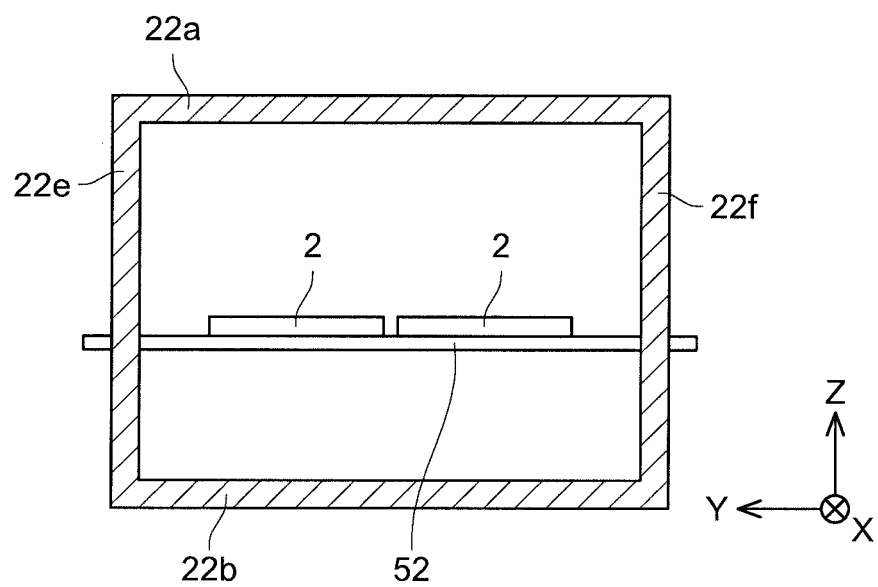
FIG. 4 illustrates a cross-sectional view along IV-IV line in FIG. 3.

The heat treatment furnace 10 is configured to heat-treat the powder in the saggars 2. As shown in FIGS. 3 and 4, the heat treatment furnace 10 comprises a furnace body 14 and the conveyor devices (52, 54). The heat treatment furnace 10 heat-treats the powder accommodated in each saggar 2 while that saggar 2 is conveyed by the conveyor devices (52, 54) inside the furnace body 14.

The furnace body 14 comprises a heat treatment unit 20 and a cooling unit 40. The furnace body 14 has a substantially cuboid shape, and is surrounded by a ceiling wall 22a, a bottom wall 22b, and side walls 22c to 22f. A partition wall 24 is disposed in the furnace body 14. In the furnace body 14, the heat treatment unit 20 is arranged upstream of the partition wall 24 and the cooling unit 40 is arranged downstream of the partition wall 24. The heat treatment unit 20 is surrounded by the ceiling wall 22a, the bottom wall 22b, the side walls 22c, 22e, 22f and the partition wall 24. In the heat treatment unit 20, pluralities of heaters 30, 32 and a plurality of conveyor rollers 52 are disposed. The heaters 30 are arranged at predetermined intervals above the conveyor rollers 52, and the heaters 32 are arranged at predetermined intervals below the conveyor rollers 52. The heaters 30, 32 are configured to generate heat therefrom, by which a space 28 inside the heat treatment unit 20 is heated and accordingly the powder accommodated in each saggar 2 is heated. The cooling unit 40 is disposed downstream of the heat treatment unit 20. The cooling unit 40 is surrounded by the ceiling wall 22a, the bottom wall 22b, the partition wall 24, and the side walls 22d, 22e, 22f. Although not shown, in the cooling unit 40, a water-cooling jacket is installed in vicinities of the ceiling wall 22a and the bottom wall 22b, respectively. Water circulates in the water-cooling jacket. The installed water-cooling jacket causes a space in the cooling unit 40 to be cooled and accordingly causes the powder accommodated in each saggar 2 to be cooled also. Alternatively, an air-cooling jacket may be disposed in the cooling unit 40 instead of the water-cooling jacket.

As shown in FIG. 3, a port 26a is defined in the side wall 22c, and a port 26c is defined in the side wall 22d. A port 26b is defined in the partition wall 24. The saggars 2 are conveyed from the port 26a by the conveyor device into the heat treatment furnace 10 and then through the heat treatment unit 20, and is conveyed from the port 26b into the cooling unit 40. Then the saggars 2 are conveyed by the conveyor device through the cooling unit 40, and conveyed from the port 26c out of the heat treatment furnace 10.

The conveyor devices (52, 54) comprise the plurality of conveyor rollers 52, and an actuation device 54. The conveyor rollers 52 are configured to convey the saggar(s) 2. The conveyor devices (52, 54) are configured to convey the saggar(s) 2 from the port 26a into the heat treatment unit 20, and convey the saggar(s) 2 in the heat treatment unit 20 and the cooling unit 40. Further, the conveyor devices (52, 54) convey the saggar(s) 2 from the port 26 out of the cooling unit 40. Each of the conveyor rollers 52 is cylindrical, and its axis extends in a direction (that is, Y direction) perpendicularly intersecting the conveying direction. The plurality of conveyor rollers 52 all have a same diameter, and are disposed at equal intervals with a certain pitch along the conveying direction. The conveyor rollers 52 are each supported rotatably about its axis, and rotate by actuation force of the actuation device 54. The actuation device 54 is an actuator (e.g. motor) configured to actuate the conveyor rollers 52. The actuation device 54 is connected to the conveyor rollers 52 via an actuation force transmission mechanism. The conveyor rollers 52 are configured to rotate when the actuation force of the actuation device 54 is transferred to the conveyor rollers 52 via the actuation force transmission mechanism (e.g., mechanism composed of sprocket and chain). The actuation device 54 is configured to actuate the respective conveyor rollers 52 so that the conveyor rollers 52 rotate at substantially same speeds. The actuation device 54 is configured to be controlled by a control device 56.

Here, an operation of the heat treatment furnace 10 when heat-treating the powder accommodated in each saggar 2 will be described. Firstly, the heaters 30, 32 are actuated so that a temperature of the space 28 is adjusted to a set temperature. Subsequently, the actuation device 54 is actuated to convey the saggars 2 from the port 26a through the space 28 in the heat treatment unit 20 to the port 26b. During this transition, the powder accommodated in each saggar 2 is heat-treated. Next, the saggars 2 are conveyed from the port 26b through the space in the cooling unit 40 to the port 26c. During this transition, the powder that was heated in the heat treatment unit 20 is cooled. In the present embodiment, two saggars 2 are arranged side by side along the Y direction, but the disclosure herein is not limited to such configuration. The saggars 2 may not be arranged side by side, but one saggar 2 may be arranged along the Y direction, or three or more saggars 2 may be arranged side by side along the Y direction. Further, although in the present embodiment the saggars 2 are conveyed without being stacked on one another in the up-down direction, the saggars 2 may be conveyed in a state of being stacked on one another in the up-down direction.

Further, the heat treatment unit 20 is configured to heat the powder accommodated in each saggar 2 for a duration of 10 hours or more and 30 hours or less. Specifically, a length of the heat treatment unit 20 in the conveying direction and a conveying speed of the saggars 2 by the conveyor rollers 52 and the actuation device 54 are adjusted such that the duration for which each saggar 2 is conveyed in the heat treatment unit 20 is 10 hours or more and 30 hours or less.

The recovery device 70 is a device configured to recover the powder that was heated by the heat treatment furnace 10 from each saggar 2. Here, the recovery device 70 only needs to be configured to recover the powder from each saggar 2, and a specific configuration thereof is not limited. For example, the recovery device 70 comprises an upside-down recovery portion (not shown) configured to recover the powder from the saggar 2 by turning the saggar 2 upside down, and an air recovery portion (not shown) configured to recover the powder adhered to the surface of the saggar 2 by removing the powder with air. The upside-down recovery portion is configured to move the powder in the saggar 2 into a container for recovery (not shown), by turning the saggar 2 upside down in the up-down direction. Due to this, almost all of the powder that was accommodated in the saggar 2 moves into the container for recovery. Thereafter, the upside-down recovery portion sets the saggar 2 to an original orientation, by again turning the saggar 2 upside down in the up-down direction. The air recovery portion is used after the powder in the saggar 2 was recovered by the upside-down recovery portion. The air recovery portion is configured to suction air (or the like) in the saggar 2 while blowing air against inner surfaces of the saggar 2. The powder adhered to the inner surfaces of the saggar 2 is removed from the inner surfaces by the air blown against the inner surfaces of the saggar 2. When the air within the saggar 2 is suctioned while being blown against the inner surfaces of the saggar 2, the powder removed from the inner surfaces of the saggar 2 is suctioned together with the air. Due to this, the powder remaining on the inner surfaces of the saggar 2 is recovered and a recovery rate of the powder increases. Although in the above example the recovery device 70 comprises the air recovery portion, the disclosure herein is not limited to such configuration. For example, the recovery device 70 may be configured such that the powder remaining on the inner surfaces of each saggar 2 is to be removed by a rotary brush.

The cleaning device 80 is a device configured to clean the inner surfaces of the saggar 2 from which the powder was recovered by the recovery device 70. The cleaning device 80 only needs to be configured to clean the inner surfaces of the saggar 2, and a specific configuration thereof is not limited. For example, the cleaning device 80 is configured to suction the air in the saggar 2 while using a rotary brush to remove substances adhered to the inner surfaces of the saggar 2. Further, the cleaning device 80 is configured to suction the air while scraping off a corroded part formed on the inner surface(s) by using a sander. The air suctioned therefrom includes scraped substances. The powder remaining on the inner surfaces of the saggar 2 is completely removed as the cleaning device 80 cleans the inner surfaces of the saggar 2. Further, there may be a case where a reaction product from the reaction between the powder and aluminum contained in the nickel-based alloy, of which each saggar 2 is constituted of, is generated during the heat treatment. The cleaning device 80 cleaning the inner surfaces of the saggar 2 also allows the reaction product that was generated during the heat treatment to be removed from the inner surfaces of the saggar 2.

The circulation and conveyor device 90 is arranged between the supply device 60, the heat treatment furnace 10, the recovery device 70, and the cleaning device 80, and is configured to convey the saggars 2 by circulating the saggars 2 between these devices. Specifically, the circulation and conveyor device 90 comprises a first conveyor portion 90a arranged between the supply device 60 and the heat treatment furnace 10, a second conveyor portion 90b arranged between the heat treatment furnace 10 and the recovery device 70, a third conveyor portion 90c arranged between the recovery device 70 and the cleaning device 80, and a fourth conveyor portion 90d arranged between the cleaning device 80 and the supply device 60. Although each of the first to fourth conveyor portions 90a, 90b, 90c, 90d is a belt conveyor, they only need to be configured to convey the saggar(s) 2, and another configuration may be implemented.

As shown in FIG. 5, the management device 92 is connected to each of the supply device 60, the heat treatment furnace 10, the recovery device 70, the cleaning device 80, and the circulation and conveyor device 90. The management device 92 is configured to control operations of each of the supply device 60, the heat treatment furnace 10, the recovery device 70, the cleaning device 80, and the circulation and conveyor device 90.

The heat treatment of the powder by the heat treatment system 100 will be described. Hereafter, processes in which a saggar 2 conveyed by the fourth conveyor portion 90d passes sequentially through the supply device 60, the first conveyor portion 90a, the heat treatment furnace 10, the second conveyor portion 90b, the recovery device 70, the third conveyor portion 90c, and the cleaning device 80, and again returns to the fourth conveyor portion 90d will be described.

Since the fourth conveyor portion 90d is arranged downstream of the cleaning device 80, the saggar 2 conveyed by the fourth conveyor portion 90d comes in a state where no substance such as the powder is accommodated and adhered inside the saggar 2 because the saggar 2 was just cleaned by the cleaning device 80. The fourth conveyor portion 90d is configured to convey the saggar 2 after the cleaning to the supply device 60. When the saggar 2 is conveyed into the supply device 60, the supply device 60 supplies the powder into the saggar 2.

Subsequently, the saggar 2 is conveyed by the first conveyor portion 90a. At this occasion, the saggar 2 is in a state of accommodating the powder therein. Next, the first conveyor portion 90a conveys the saggar 2 with the powder accommodated therein to the heat treatment furnace 10.

When the saggar 2 has reached the heat treatment furnace 10, the heat treatment furnace 10 heat-treats the powder accommodated in the saggar 2 while conveying the saggar 2 with the conveyor rollers 52. Here, if multiple saggars 2 are to be heat-treated in the state of being stacked on one another in the up-down direction, the saggars 2 are stacked on one another in the up-down direction before the saggars 2 are put into the heat treatment furnace 10. As mentioned above, in the present embodiment, the powder accommodated in the saggar 2 is heat-treated in the atmosphere including oxygen at the temperature of substantially 800° C. for 10 hours. The powder accommodated in the saggar 2 is heat-treated by the heat treatment unit 20, and the saggar 2 is conveyed into and through the cooling unit 40. During this, the saggar 2 and the powder accommodated in the saggar 2 are cooled. Subsequently, the saggar 2 is conveyed to the recovery device 70 by the second conveyor portion 90b. At this occasion, the saggar 2 is in a state of accommodating the powder which was just heat-treated therein.

Subsequently, the powder accommodated in the saggar 2 is recovered by the recovery device 70. That is, the powder after the heat treatment is recovered. Subsequently, the saggar 2 is conveyed by the third conveyor portion 90c. At this occasion, although the saggar 2 barely accommodates the powder therein, the saggar 2 is in a state where the powder which was not recovered and/or the reaction product (e.g., reaction product between aluminum and the powder) generated during the heat treatment are adhered to its inner surface. Subsequently, the third conveyor portion 90c conveys the saggar 2 to the cleaning device 80. Next, the inner surface of the saggar 2 is cleaned by the cleaning device 80. Thereafter, the saggar 2 returns to the fourth conveyor portion 90d again. At this occasion, the saggar 2 is in a state where none of the powder or no reaction product which was generated during the heat treatment are present on its inner surface, and is in a re-usable state. Then, the saggar 2 is again conveyed to the supply device 60 to be used for heat-treating the powder.

Figure 6:
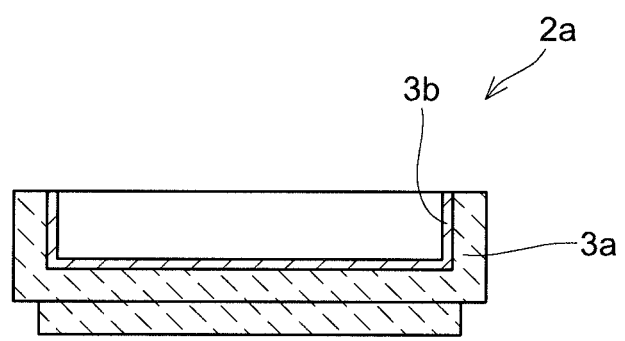
FIG. 6 illustrates a cross-sectional view of another example of a saggar.

Although in the first and second embodiments, the saggar 2 is constituted of the nickel-based alloy, the disclosure herein is not limited to such configuration. For example, as shown in FIG. 6, a saggar 2a may be configured such that an inner surface thereof which makes contact with the powder is only constituted of a nickel-based alloy, and other part(s) are constituted of ceramic. Specifically, a body 3a of the saggar 2a may be constituted of the ceramic, while an inner surface 3b of the body 3a (surface which makes contact with the powder when the saggar 2a has the powder accommodated therein) may be constituted of the nickel-based alloy. The ceramic is smaller in weight than metal. Due to this, by comprising the body 3a constituted of the ceramic, the weight of the saggar 2a can be made small, and by comprising the inner surface 3b of the saggar 3a constituted of the nickel-based alloy, the same effect as that of the above saggar 2 can be brought forth.

Further, although in the above first embodiment the heat treatment furnace 110 is a batch-type heat treatment furnace and in the above second embodiment, the heat treatment furnace 10 is a heat treatment furnace (e.g., roller hearth kiln) configured to heat-treat a treatment object while conveying the object by the conveyor devices (52, 54), the disclosure herein is not limited to such configuration. A heat treatment furnace comprised by the heat treatment system only needs to be configured to heat-treat powder of a lithium positive electrode material accommodated in the saggar(s) 2, 2a at a temperature of 300° C. or more and 1000° C. or less for a duration of 10 hours or more and 30 hours or less, and a method of conveying the saggar(s) 2, 2a in the heat treatment furnace and presence/absence of conveying of the saggar(s) 2, 2a within the heat treatment furnace are not specifically limited. For example, the heat treatment furnace may be a pusher kiln configured to convey the saggar(s) 2, 2a by pushing the saggar(s) 2, 2a with a pusher, or a walking beam heating furnace configured to convey the saggar(s) 2, 2a with a walking beam mechanism.

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A heat treatment system comprising:
one or more saggars, each of which is configured to accommodate powder of a lithium positive electrode material, and each of which comprises a contact surface which is to make contact with the powder;
a supply device configured to supply the powder into each of the one or more saggars;
a heat treatment furnace configured to heat-treat the powder accommodated in each of the one or more saggars;
a recovery device configured to recover the powder heat-treated by the heat treatment furnace from each of the one or more saggars; and
a cleaning device configured to clean the contact surface of each of the one or more saggars after the heat-treated powder has been recovered by the recovery device,
wherein
at least the contact surface of each of the one or more saggars is constituted of a nickel-based alloy,
the heat treatment furnace is configured to heat-treat the powder accommodated in each of the one or more saggars at a temperature of 300° C. or more and 1000° C. or less for a duration of 10 hours or more and 30 hours or less,
the cleaning device is configured to remove the heat-treated powder having remained on the contact surface of each of the one or more saggars and a reaction product generated by heat-treating the powder from the contact surface of each of the one or more saggars after the heat-treated powder has been recovered by the recovery device, and
the one or more saggars are used such that each of the one or more saggars circulates between the supply device, the heat treatment furnace, the recovery device, and the cleaning device.

2. The heat treatment system according to claim 1, wherein
the nickel-based alloy contains aluminum, and
an aluminum content of the nickel-based alloy is 1 wt % or more and 10 wt % or less.

3. The heat treatment system according to claim 2, wherein
the one or more saggars are each configured such that a film thickness of an $Al_2O_3$ film formed on the contact surface when the one or more saggars are exposed to an oxygen-containing atmosphere at the temperature of 800° C. for 10 hours is within a range of 1 μm to 1 mm.

4. The heat treatment system according to claim 1, wherein
the heat treatment furnace is configured to heat-treat the powder accommodated in the one or more saggars in an oxygen-containing atmosphere.

5. The heat treatment system according to claim 1, wherein
the heat treatment furnace comprises a heat treatment unit configured to heat-treat the powder accommodated in the one or more saggars and a cooling unit configured to cool the powder that has been heat-treated by the heat treatment unit.

6. The heat treatment system according to claim 1, wherein
the one or more saggars comprise a plurality of saggars, and
the plurality of saggars is configured to be arranged in the heat treatment furnace in a state of being stacked in an up-down direction.

7. A saggar for heat-treating powder of a lithium positive electrode material, the saggar being configured to accommodate the powder and to be disposed in a heat treatment furnace for heat treatment of the powder, wherein
the saggar comprises a contact surface which is to make contact with the powder, wherein at least the contact surface of the saggar is constituted of a nickel-based alloy,
the nickel-based alloy contains aluminum, and an aluminum content of the nickel-based alloy is 1 wt % or more and 10 wt % or less, and
the saggar is configured such that a film thickness of an $Al_2O_3$ film formed on the contact surface when the nickel-based alloy is exposed to an oxygen-containing atmosphere at a temperature of 800° C. for 10 hours is within a range of 1 μm to 1 mm.

8. A method of heat-treating powder of a lithium positive electrode material, the method comprising:
supplying the powder into one or more saggars, each of which comprises a contact surface which is to make contact with the powder;
heat-treating the powder supplied in each of the one or more saggars,
recovering the heat-treated powder from each of the one or more saggars,
removing the heat-treated powder having remained on the contact surface of each of the one or more saggars and a reaction product generated by heat-treating the powder from the contact surface of each of the one or more saggars after recovering the heat-treated powder, and
circulating the one or more saggars between supplying the powder into each of the one or more saggars, heat-treating the powder supplied in each of the one or more saggars, recovering the heat-treated powder from each of the one or more saggars, and removing the heat-treated powder having remained on the contact surface of each of the one or more saggars and a reaction product generated by heat-treating the powder from the contact surface of each of the one or more saggars after recovering the heat-treated powder,
wherein at least the contact surface of each of the one or more saggars is constituted of a nickel-based alloy, and
the heat-treating comprises heat-treating the powder supplied in each of the one or more saggars at a temperature of 300° C. or more and 1000° C. or less for a duration of 10 hours or more and 30 hours or less.

* * * * *